United States Patent
Nicolai

(10) Patent No.: US 8,555,775 B2
(45) Date of Patent: Oct. 15, 2013

(54) METHOD FOR OPERATING OF A BOILER OF A DEVICE SUCH AS A COFFEE MAKER

(75) Inventor: Haayo Nicolai, Hoogeveen (NL)

(73) Assignee: Koninklijke Philips N.V., Eindhoven (NL)

( * ) Notice: Subject to any disclaimer, the term of this patent is extended or adjusted under 35 U.S.C. 154(b) by 1388 days.

(21) Appl. No.: 10/594,489

(22) PCT Filed: Mar. 17, 2005

(86) PCT No.: PCT/IB2005/050938
§ 371 (c)(1),
(2), (4) Date: Sep. 27, 2007

(87) PCT Pub. No.: WO2005/094644
PCT Pub. Date: Oct. 13, 2005

(65) Prior Publication Data
US 2008/0121109 A1 May 29, 2008

(30) Foreign Application Priority Data
Mar. 31, 2004 (EP) .................................... 04101321

(51) Int. Cl.
*A47J 31/00* (2006.01)
*A47J 27/21* (2006.01)
*H05B 1/02* (2006.01)

(52) U.S. Cl.
USPC ............... 99/281; 99/285; 219/441; 219/492; 219/494; 219/497

(58) Field of Classification Search
USPC ............ 99/281, 285, 333, 337; 219/438, 441, 219/492, 494, 497; 392/441, 442, 449, 451
See application file for complete search history.

(56) References Cited

U.S. PATENT DOCUMENTS

| 4,484,515 | A |   | 11/1984 | Illy |
|---|---|---|---|---|
| 5,019,690 | A | * | 5/1991 | Knepler ......................... 219/400 |
| 5,285,717 | A | * | 2/1994 | Knepler ........................... 99/282 |
| 5,372,061 | A | * | 12/1994 | Albert et al. ..................... 99/281 |
| 6,164,189 | A | * | 12/2000 | Anson ............................. 99/281 |
| 6,305,267 | B1 |   | 10/2001 | Rolfes |
| 6,560,409 | B2 | * | 5/2003 | Troost, IV ..................... 392/498 |
| 8,111,980 | B2 | * | 2/2012 | Bradenbaugh ................ 392/478 |
| 2003/0126993 | A1 |   | 7/2003 | Lassota et al. |

FOREIGN PATENT DOCUMENTS

| EP | 0 139 395 | 5/1985 |
|---|---|---|
| EP | 1 076 212 | 2/2001 |
| JP | 2003299577 A | 10/2003 |

* cited by examiner

*Primary Examiner* — Reginald L Alexander

(57) ABSTRACT

A method for operating a boiler of a device, such as a coffee maker, includes initial steps aimed at determining whether the boiler is filled with water or not. In the process, the insight that the thermal behavior of an empty boiler differs from the thermal behavior of a filled boiler is applied. A heating element of the boiler is used to generate heat during a predetermined length of time. As a result, the temperature inside the boiler starts to change. At a certain point, the temperature change over a time interval having a predetermined length is measured. Subsequently, the measured temperature change is compared with a reference temperature change. In case the measured temperature change is larger than the reference temperature change, it is concluded that the boiler is empty and needs to be filled before the heating element is activated again.

15 Claims, 3 Drawing Sheets

METHOD FOR OPERATING OF A BOILER OF A DEVICE SUCH AS A COFFEE MAKER

The present invention relates to a method for operating a boiler of a device such as a coffee maker, which boiler comprises a container for containing water and a heating element for heating the water to a predetermined temperature.

It is noted that the term "coffee maker" should be understood such as to cover all kinds of devices with which at least one cup of coffee or a coffee variant can be obtained, including coffee vending machines and espresso machines.

One known type of coffee maker comprises a brew chamber in which the coffee is actually made. In case a user desires to obtain a cup of coffee, he places a coffee pad comprising an envelope filled with a quantity of ground coffee beans in the brew chamber. During operation of the coffee maker, a quantity of water is forced to flow through the coffee pad. In the process, the envelope acts as a coffee filter. In this way, on the basis of the interaction between the pressurized water and the coffee pad inside the brew chamber, the desired cup of coffee is obtained.

For the purpose of heating the water to a predetermined temperature, usually about 95° C., the coffee maker comprises a boiler. For the purpose of pressurizing the water, the coffee maker comprises a pump. The pump, the boiler and the brew chamber are interconnected by means of tubes for transporting water.

In case the boiler is already filled with water at the start of a procedure of making coffee, it is sufficient to activate the pump only one single time during the procedure. As this is preferred over activating the pump more than one time during the procedure, the coffee maker is arranged such as to realize that at the end of a coffee making procedure, the boiler gets filled with a quantity of water which may be used during a next time the coffee maker is applied. More in particular, when the coffee maker is used, the boiler is operated first to heat the water that is contained by it. As soon as the water has reached the predetermined temperature, the pump may be activated to press the heated water through the coffee pad in the brew chamber and to supply a new quantity of water to the boiler at the same time. In fact, during operation of the pump, the quantity of heated water which is discharged from the brew chamber is replaced by this new quantity of water.

The procedure described in the preceding paragraph can be executed without any problems when the coffee maker has already been used before. However, this procedure is not applicable to the situation in which the coffee maker is used for the very first time. In that situation, the boiler is empty, and additional measures need to be taken to fill the boiler with water before the actual procedure of making coffee can take place. For this purpose, the user is instructed to perform a special filling procedure, in which he needs to fill a water tank of the coffee maker, and in which he needs to activate the pump to pump the water from the water tank to the boiler. In view of the serviceability of the coffee maker, it is disadvantageous that the user does not only need to know how to activate the coffee maker in order to obtain a cup of coffee, but also needs to know how to activate the coffee maker in order to have the special filling procedure executed. It is an objective of the present invention to solve at least this problem by providing a method for operating the boiler of the coffee maker, which brings along the advantageous effect that the user does not need to decide before activation of the coffee maker whether the normal coffee making procedure or the special filling procedure needs to be started, and which does not require special knowledge of the user in case the boiler needs to be filled.

It is noted that in the case of the coffee maker, it is not possible to apply a relatively simple solution in the form of a float or the like to determine a water level in the boiler, in view of the fact that a certain level of internal pressure needs to be maintained for a proper operation of the coffee maker.

According to the present invention, a method for operating a boiler of a device such as a coffee maker, which boiler comprises a container for containing water and a heating element for heating the water to a predetermined temperature, comprises the following successive steps:
1) activating the heating element of the boiler during a predetermined length of time;
2) measuring at least one characteristic of the thermal behavior displayed by the boiler as a consequence of the activation of the heating element;
3) verifying whether the measured characteristic is in a range associated with thermal behaviour of a boiler filled with water or a range associated with thermal behaviour of an empty boiler;
4) only in case the measured characteristic appears to be in the range associated with thermal behaviour of an empty boiler, filling the container of the boiler with a predetermined quantity of water; and
5) activating the heating element of the boiler to heat the water in the container of the boiler to the predetermined temperature.

When the method according to the present invention is applied, it is determined on the basis of thermal behaviour of the boiler whether the boiler is filled with water or not. In general, the present invention is based on the insight that a heating-up process of an empty boiler differs from a heating-up process of a boiler filled with water.

Thermal behaviour is related to the way in which the temperature of an object changes under the influence of an exposure to a heat source. For example, the thermal behaviour may be represented by a relation between the temperature and the time, or a relation between a rate of change of the temperature and the time.

In order to be capable of determining the thermal behaviour of the boiler, the heating element of the boiler is used to generate heat during a predetermined length of time. As a result, the temperature inside the boiler starts to change, in a way which is related to the thermal behaviour of the boiler. In order to find out if the thermal behaviour of the boiler corresponds to thermal behaviour of a boiler filled with water or thermal behaviour of an empty boiler, at least one characteristic of the thermal behaviour is measured, after which it is verified whether this measured characteristic is in a range associated with thermal behaviour of a boiler filled with water or a range associated with thermal behaviour of an empty boiler. In case the measured characteristic appears to be in the range associated with the thermal behaviour of an empty boiler, the boiler needs to be filled prior to the step of activating the heating element of the boiler to further heat the water in the container of the boiler to the predetermined temperature. In case the measured characteristic appears to be in the range associated with the thermal behaviour of a boiler filled with water, the process of further heating the water to a predetermined temperature can be started directly.

In a preferred way of carrying out the method according to the present invention, the step of verifying whether the measured characteristic is in a range associated with thermal behaviour of a boiler filled with water or a range associated with thermal behaviour of an empty boiler is realized by comparing the measured characteristic with a reference characteristic which is between the two ranges. The comparison points out whether the measured characteristic is at a side of the reference characteristic where the range associated with thermal behaviour of a boiler filled with water is or a side of the reference characteristic where the range associated with thermal behaviour of an empty boiler is.

Within the scope of the present invention, the measured characteristic may for example be a temperature change over a time interval having a predetermined length and a predetermined starting time with respect to a starting time of the first operation of the heating element of the boiler.

An important advantage of the method according to the present invention over the method according to the state of the art is that the user does not need to start a special procedure in order to make sure that the boiler gets filled with water the first time the coffee maker is used. The steps of the method according to the present invention may for example be laid down in a controller of the coffee maker, which is thereby capable of checking the state of the boiler, wherein it is not necessary for the user to supply input regarding said state. The controller may be programmed such as to realize that when the filling procedure according to the present invention is executed, the interaction with the user is comparable to the interaction with the user during a normal coffee making procedure. As an advantageous consequence, the user is capable of applying his knowledge of how to operate the coffee maker during a normal coffee making procedure to the filling procedure as well.

The present invention will now be explained in greater detail with reference to the figures, in which.

Figure 1:
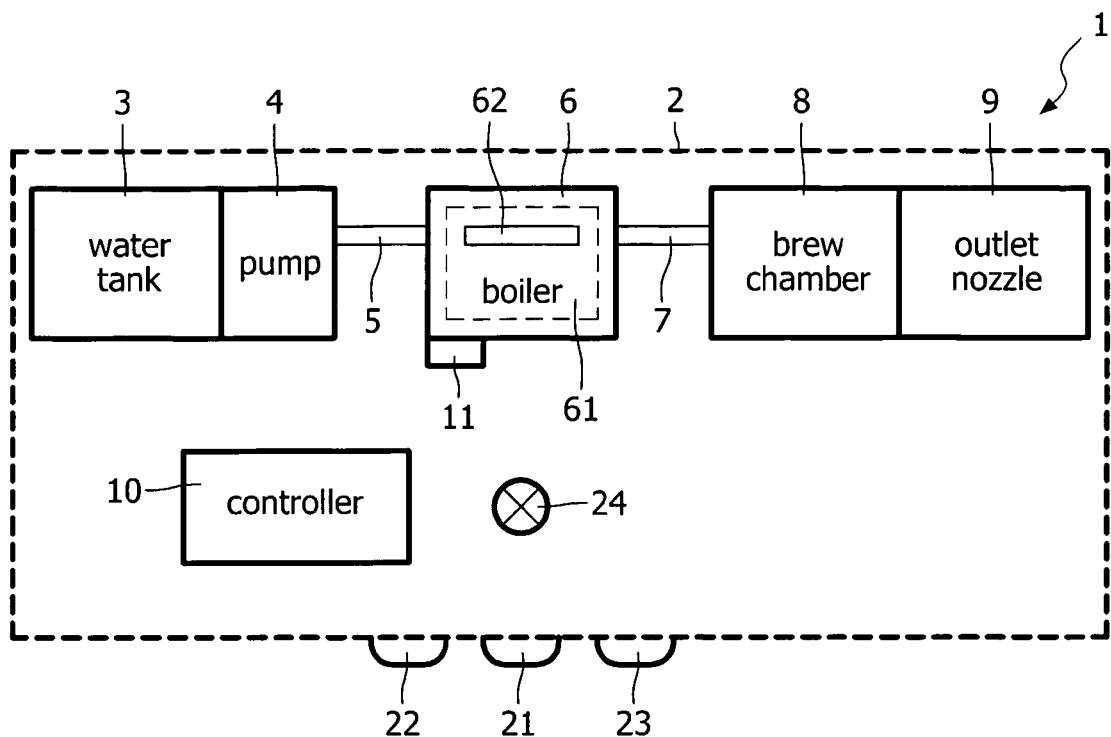
FIG. 1 is a block diagram showing various components of a coffee maker.

FIG. 1 diagrammatically shows various components of a coffee maker 1. This coffee maker 1 is to be regarded as an arbitrary example of a device containing a boiler for heating water.

A first shown component of the coffee maker 1 is a housing 2 for accommodating most of the components of the coffee maker 1. At an outside of the housing 2, buttons 21, 22, 23 are arranged, which are to be pressed by a user of the coffee maker. One of the buttons 21, 22, 23 is referred to as main button 21, and needs to be pressed by the user in case he wants to activate or turn off the coffee maker 1. Another of the buttons 21, 22, 23 is referred to as one cup button 22, and needs to be pressed at a certain stage in a coffee making procedure in case the user desires the coffee maker 1 to deliver a quantity of coffee which is associated with one cup. Yet another of the buttons 21, 22, 23 is referred to as two cups button 23, and needs to be pressed at a certain stage in a coffee making procedure in case the user desires the coffee maker 1 to deliver a quantity of coffee which is associated with two cups. Besides the buttons 21, 22, 23, an indicator light 24 is arranged at the outside of the housing 2.

A second shown component of the coffee maker 1 is a water tank 3 for containing water. This water tank 3 may be shaped in any suitable way. Preferably, the water tank 3 is detachably arranged, so that the user is capable of bringing the water tank 3 to a tap or the like in order to fill the water tank 3, without having to move the entire coffee maker 1.

The present invention is also applicable in the context of coffee makers which do not comprise a water tank, but which are connected to some kind of water supplying system through a suitable closing device, such as a tap.

A third shown component of the coffee maker 1 is a pump 4 for forcing the water to flow through the coffee maker 1, wherein the pump 4 may be of any suitable type.

A fourth shown component of the coffee maker 1 is a boiler 6 for heating the water, which boiler 6 comprises a container 61 for containing water and a heating element 62 for heating the water to a predetermined temperature. In FIG. 1, the container 61 is diagrammatically depicted as a dashed rectangle, and the heating element 62 is depicted as a continuous rectangle.

The boiler 6 may be of any suitable type. The boiler 6 and the pump 4 are interconnected by means of a pump tube 5. When the pump 4 is operated, the water is forced to flow from the pump 4 to the boiler 6, through the pump tube 5.

A fifth shown component of the coffee maker 1 is a brew chamber 8. The brew chamber 8 and the boiler 6 are interconnected by means of a boiler tube 7. The brew chamber 8 is adapted to accommodating at least one coffee pad. During operation, the actual process of making coffee takes place inside the brew chamber 8, as in the brew chamber 8, the water is forced to flow through the coffee pad.

A sixth shown component of the coffee maker 1 is an outlet nozzle 9, which is directly connected to the brew chamber 8, and which serves for letting out freshly brewed coffee from the coffee maker 1.

A seventh shown component of the coffee maker 1 is a controller 10, which is arranged such as to receive signals corresponding to the state of various components of the coffee maker 1, for example the position of the buttons 21, 22, 23, which is adapted to processing these signals according to a predetermined schedule, and which is adapted to controlling the operation of operable components, for example the indicator light 24 and the pump 4.

An eighth shown component of the coffee maker 1 is a temperature detector 11 which is arranged such as to detect a temperature inside the boiler 6. The temperature detector 11 is connected to the controller 10, so that the controller 10 is capable of receiving signals representing the temperature inside the boiler 6 from the temperature detector 11.

When a user decides to apply the coffee maker 1 to make one or two cups of coffee, he first needs to prepare the coffee maker 1 by following the steps listed below:

1) filling the water tank 3 with water. In the process, the user needs to take care that the quantity of water in the water tank 3 is at least the quantity of water needed for making the cup of coffee.
2) placing at least one coffee pad in the brew chamber 8. The coffee maker 1 may for example comprise a separate carrier for receiving the coffee pad(s), which may easily be inserted in the brew chamber 8.
3) placing one or two coffee cups in the proper position for receiving coffee from the coffee maker 1.

It is noted that the coffee maker 1 comprises a float (not shown) for determining a water level in the water tank 3. During the coffee making process, the controller 10 detects and interprets the position of the float. If it turns out that the water tank 3 is empty or the quantity of water inside the water tank 3 is insufficient for the required quantity of coffee, the controller 10 will stop the procedure and alarm the user of the coffee maker 1 by means of the indicator light 24, which in that case is activated to blink quickly. For example, the indicator light 24 is alternately 0.1 seconds activated and 0.1 seconds deactivated by the controller 10. The coffee making process is not started until the controller 10 detects by means of the float that the water level in the water tank 3 has reached a sufficient value.

The coffee maker 1 is activated by pressing the main button 21. According to an important aspect of the present invention, as soon as the controller 10 receives a signal that is generated on the basis of pressing the main button 21, the controller 10 starts a primary procedure, which may be performed in several ways, dependent of various conditions. A first preferred way of carrying out the primary procedure is illustrated by means of FIG. 2, and is described in the following.

Figure 2:
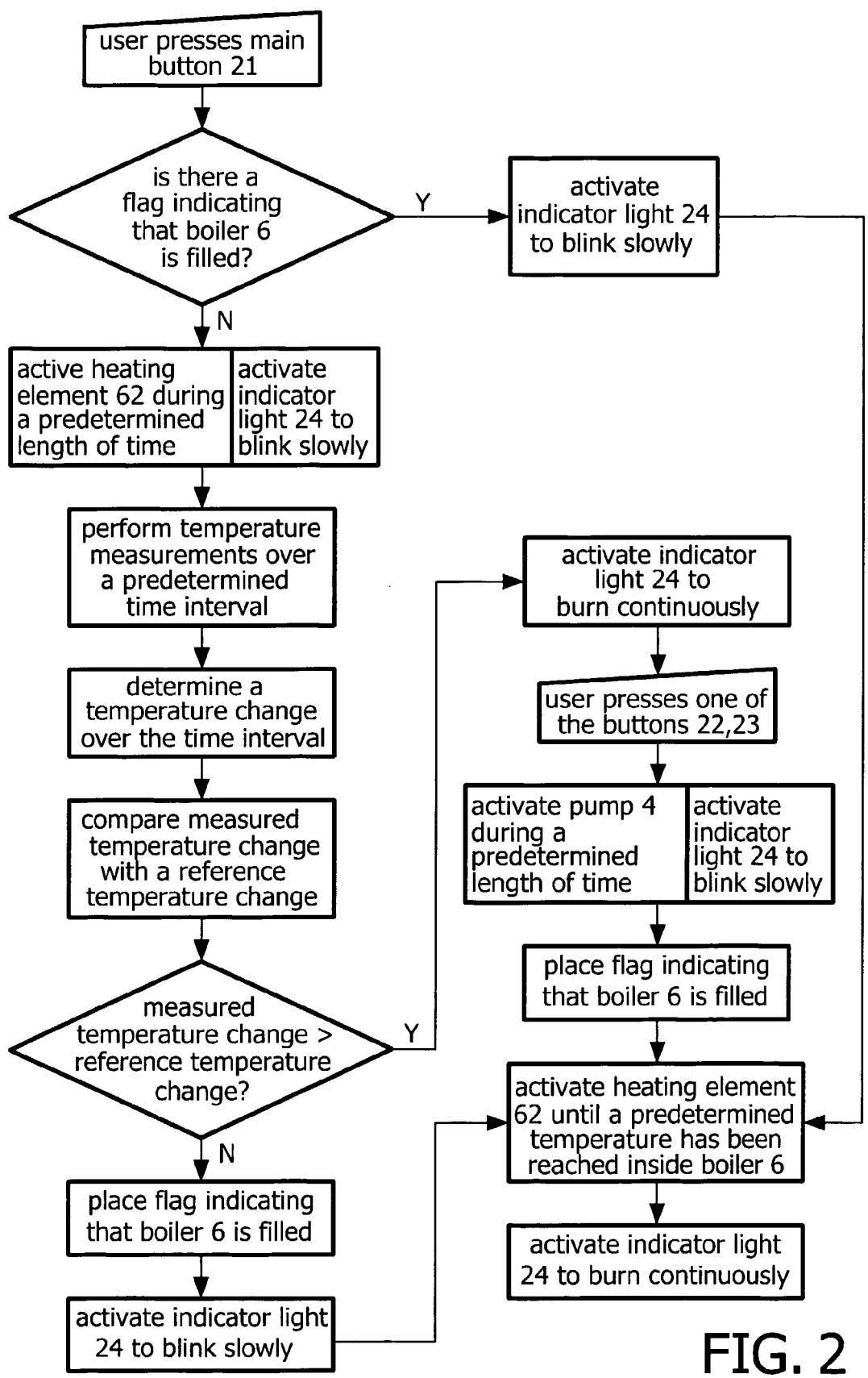
FIG. 2 is a flowchart showing a first preferred series of steps which are followed when the coffee maker is applied.

It is noted that FIG. 2 is a flowchart showing important steps of the primary procedure. The steps which do not need to be performed by the user, i.e. the steps which are mentioned in rectangular boxes, are performed by the controller 10 of the coffee maker 1.

The primary procedure starts with checking whether a flag indicating that the boiler 6 is filled is present in the controller 10. In case the flag is not present, the controller 10 starts a procedure for checking the state of the boiler 6. As a first step in this procedure, the controller 10 activates the heating element 62 of the boiler 6 during a predetermined length of time. At the same time, the controller 10 activates the indicator light 24 to blink slowly in order to inform the user that the coffee maker 1 is busy. For example, the indicator light 24 is alternately 1 second activated and 1 second deactivated by the controller 10. As a result of the activation of the heating element 62, the temperature in the boiler 6 increases.

At a predetermined starting time with respect to a starting time of the activation of the heating element 62, a measurement of the temperature inside the boiler 6 by means of the temperature detector 11 is initiated. The temperature detector 11 is positioned at a distance from the heating element 62, so that a direct influence of the temperature of the heating element 62 on the measurement performed by the temperature detector 11 is minimized.

The temperature inside the boiler 6 is measured at least two times during a predetermined time interval. On the basis of the results of the temperature measurements, the controller 10 is capable of determining a temperature change over the time interval. Subsequently, the determined temperature change is compared with a predetermined reference temperature change. This reference temperature change is determined on the basis of experiments in which a temperature change in an empty boiler 6 and a temperature change in a filled boiler 6 have been measured over the time interval. It is understood that a heating-up process of an empty boiler 6 differs from a heating-up process of a filled boiler 6. Consequently, the temperature change associated with an empty boiler 6 differs from the temperature change associated with a filled boiler 6. The reference temperature change is chosen such as to be between these two temperature changes. Dependent of the position in time of the time interval with respect to a starting time of the heating-up process, the temperature change associated with an empty boiler 6 is larger or smaller than the temperature change associated with a filled boiler 6. In the shown example, it is assumed that the position in time of the time interval is chosen such that the temperature change associated with an empty boiler 6 is larger than the temperature change associated with a filled boiler 6. Therefore, if a measured temperature change is smaller than the reference temperature change, it is safe to assume that the boiler 6 is filled with water, and if a measured temperature change is larger than the reference temperature change, the conclusion that the boiler 6 is empty is justified.

The continuation of the primary procedure is dependent of the outcome of the comparison between the measured temperature change and the reference temperature change.

In case the measured temperature change is smaller than the reference temperature change, in other words, in case the boiler 6 is filled with water, the controller 10 places a flag indicating that the boiler 6 is filled. Furthermore, the controller 10 activates the heating element 62 a second time in the primary procedure, until the temperature of the water inside the boiler 6 has reached a predetermined temperature, preferably close to the boiling point, for example 95° C. In the process, the indicator light 24 is activated by the controller 10 to blink slowly. When the temperature of the water has reached the predetermined temperature, the controller 10 deactivates the heating element 62 again, on the basis of an interpretation of signals obtained by means of the temperature detector 11, representing the temperature inside the boiler 6. Subsequently, the indicator light 24 is activated by the controller 10 to burn continuously, whereby the user is informed that the coffee maker 1 is ready for further use, and that he may press the one cup button 22 or the two cups button 23 in order to start a secondary procedure, during which the heated water is forced to flow from the boiler 6 to the outlet nozzle 9, through the brew chamber 8 and the at least one coffee pad positioned inside the brew chamber 8, and during which fresh water from the water tank 3 is supplied to the boiler 6 for the purpose of a next coffee making procedure.

In case the measured temperature change is larger than the reference temperature change, in other words, in case the boiler 6 appears to be empty, the controller 10 activates the indicator light 24 to burn continuously, without any further activation of the heating element 62. The user interprets the burning of the indicator light 24 as a signal that the coffee maker 1 is ready for further use, and that one of the one cup button 22 and the two cups button 23 needs to be pressed in order to continue the coffee making procedure. As soon as he has pressed one of these buttons 22, 23, the indicator light 24 is activated to blink slowly, and the pump 4 is activated during a predetermined length of time, so that a predetermined quantity of water is pumped from the water tank 3 to the boiler 6. In the process, the heating element 62 is activated a second time during the primary procedure, and the water is heated until the temperature of the water has reached the predetermined temperature. In order to save time, the heating element 62 may already be activated while the pump 4 is still working, but this is not necessary. After the operation of the pump 4 has been terminated, the controller 10 places a flag indicating that the boiler 6 is filled. As soon as the heating process has stopped, the controller 10 activates the indicator light 24 to burn continuously a second time during the primary procedure, so that the user is informed that the coffee maker 1 is ready for further use, and that he needs to press the one cup button 22 or the two cups button 23 again in order to continue the coffee making procedure. As soon as the user has pressed one of these buttons 22, 23, the secondary procedure is started and the required cup(s) of coffee is (are) obtained.

Preferably, for obvious reasons, the predetermined quantity of water that is displaced by the pump 4 in order to fill the boiler 6 should not exceed the volume of the container 61 of the boiler 6. By controlling the length of time during which the pump 4 is activated, the quantity of water is controlled.

The above-described way of performing the primary procedure pertains to the situation in which there appears to be no flag indicating that the boiler 6 is filled at the start. In case such flag is present, there is no need to check the state of the boiler 6, and the controller 10 directly activates the heating element 62 to heat the water inside the boiler 6 to the predetermined temperature, while activating the indicator light 24 to blink slowly. When the temperature of the water inside the boiler 6 has reached the predetermined level, the heating element 62 is deactivated again, and the indicator light 24 is activated to burn continuously in order to inform the user that the coffee maker 1 is ready for further use.

The flag indicating that the boiler 6 is filled is set and recognized by the controller 10. In case this flag is not present at the start of the primary procedure, the flag is set once the boiler 6 has been filled by means of activating the pump 4 during a predetermined length of time, or once it appears on the basis of the measurements that there is water inside the boiler 6. In case this flag is present at the start of the primary procedure, the flag is maintained for the purpose of a next coffee making procedure. It will be understood that the flag is not present in a situation in which the coffee maker 1 is used for the very first time. In that situation, the state of the boiler 6 will be checked, and the temperature measurements will point out that the boiler 6 needs filling. Furthermore, the flag is not present after the coffee maker 1 has been disconnected from the mains. In that situation, the state of the boiler 6 will also be checked, wherein it may turn out that the boiler 6 is empty, or wherein it may turn out that the boiler 6 is already filled.

In order to operate the coffee maker 1, the two things a user needs to know is 1) that the coffee making procedure is started when the main button 21 is pressed and 2) that one of the one cup button 22 and the two cups button 23 needs to be pressed when the indicator light 24 is burning. There is no need for a user to know more, even in case the boiler 6 is empty. Moreover, the user does not need to realize whether the boiler 6 is filled or not, as the state of the boiler 6 is always automatically checked by determining the thermal behaviour of the boiler 6, in case the controller 10 does not detect the presence of a flag indicating that the boiler 6 is filled.

An important aspect of the present invention is that the question whether the boiler 6 is filled or not is answered by looking at the thermal behaviour of the boiler 6 in the light of a reference thermal behaviour. In order to apply the method according to the present invention, it is not necessary to provide the coffee maker 1 with additional components, as the heating element 62 and the temperature detector 11 are already present.

Figure 3:
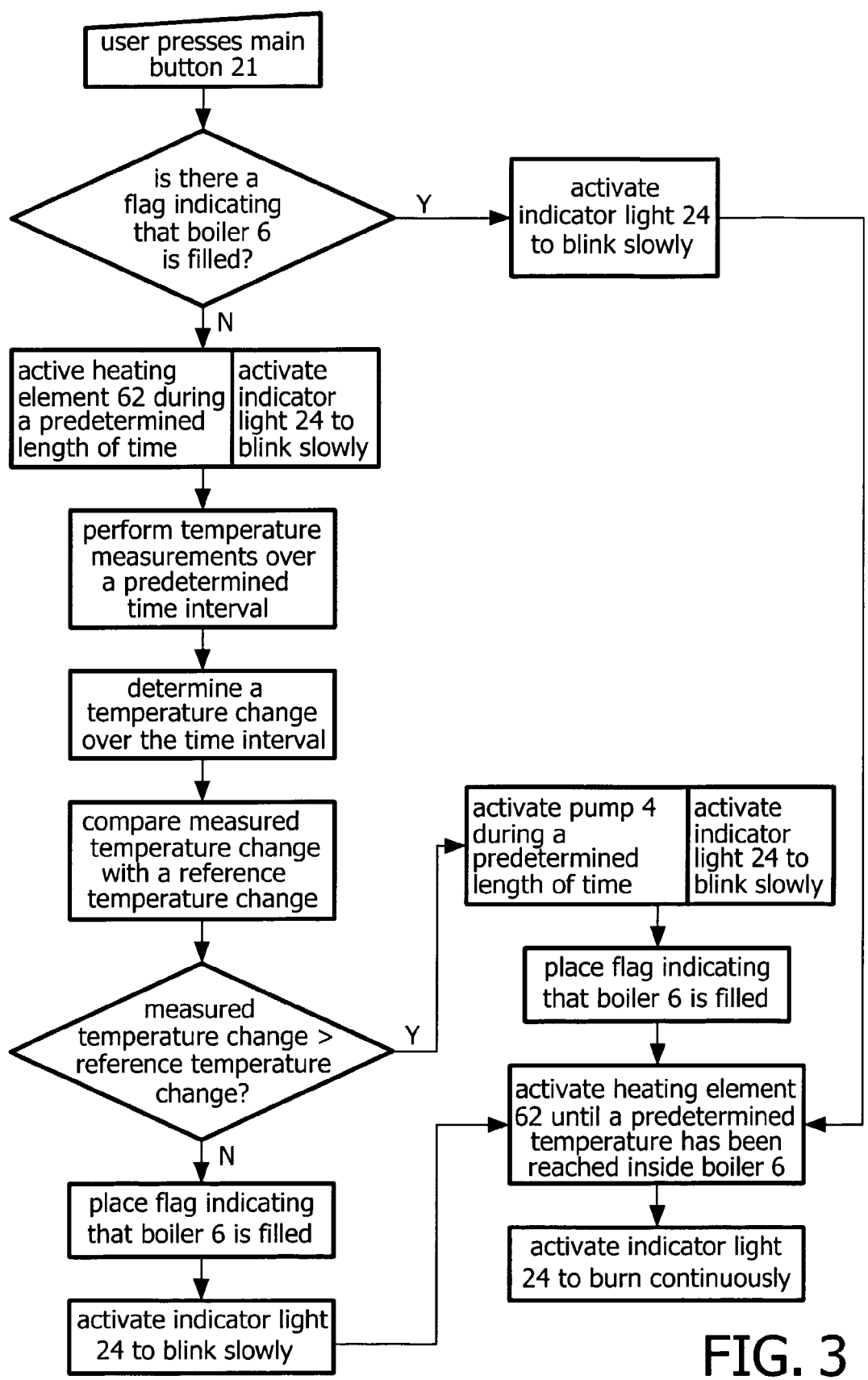
FIG. 3 is a flowchart showing a second preferred series of steps which are followed when the coffee maker is applied.

Within the scope of the present invention, it is possible that the end of the primary procedure is reached without the intervention of the user. In that case, the controller 10 is programmed such as to continue the primary procedure by starting the pump 4 as soon as the comparison of the measured temperature change and the reference temperature change shows that the measured temperature change is larger than the reference temperature change. The above-described steps of activating the indicator light 24 and waiting until the user has pressed one of the one cup button 22 and the two-cups button 23 are omitted. In FIG. 3, a flowchart showing important steps of this shortened primary procedure is depicted. An advantage of following the steps of the shortened primary procedure is that the end of the primary procedure is reached without the intervention of the user, whether the boiler 6 is filled or not. However, in order to avoid a situation in which the user takes alarm at the pump 4 being started without his intervention, it may be preferred to interrupt the primary procedure as soon as filling of the boiler 6 appears to be necessary, and to only continue the procedure when the user has pressed one of the one cup button 22 and the two cups button 23.

Furthermore, it is also possible that the steps of the coffee making procedure are such that when the coffee maker 1 is activated, the end of the secondary procedure is reached without intervention of the user. In that case, the user has to indicate at the start of the coffee making procedure if he desires one cup of coffee or two cups of coffee by pressing the relevant button 22, 23. However, when the coffee making procedure is performed uninterruptedly from start to finish, the above-described undesirable situation of the user taking alarm at the sudden start of the pump 4 during the procedure is obtained.

In accordance with the above-described examples, the controller 10 may be programmed such as to inform the user that the heating process of the water inside the boiler 6 takes place, for example by means of the indicator light 24, which may be activated to blink slowly. In that case, the user knows the water is heated as long as the indicator light 24 is blinking slowly, and that the coffee maker 1 is ready for further use as soon as the indicator light 24 is burning continuously. Furthermore, the indicator light 24 may be used to indicate something is wrong. As already mentioned, in such case, the controller 10 may activate the indicator light 24 to blink quickly.

It will be understood that within the scope of the present invention, it is not essential which type of indicating means is applied, and it is not essential which kind of behaviour of the indicating means is coupled to a certain situation.

Figure 4:
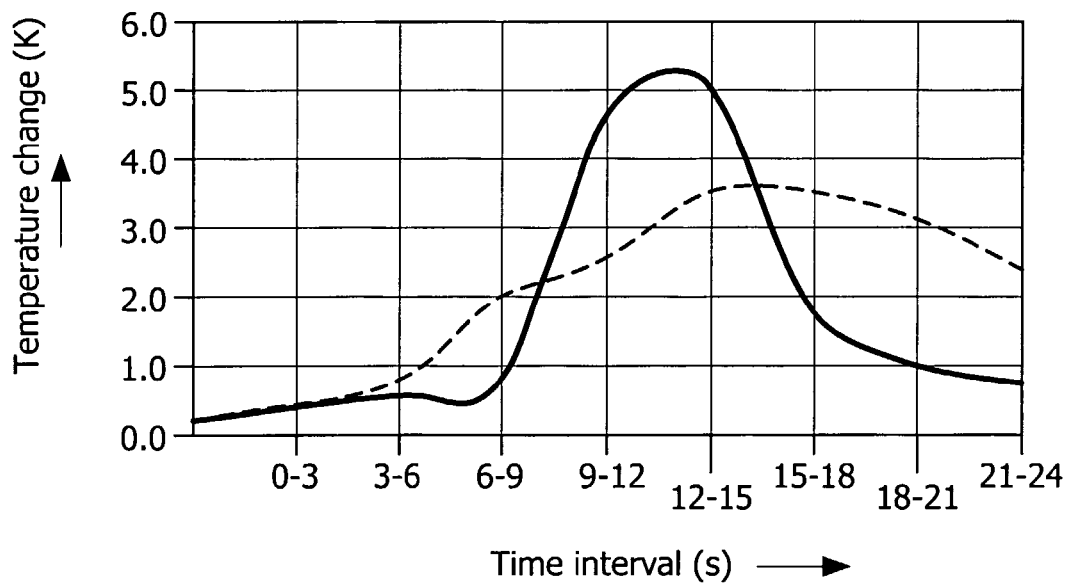
FIG. 4 is a graphical drawing depicting an experimentally determined relation between a temperature change measured in a boiler of the coffee maker and an associated time interval.

FIG. 4 is a graphical drawing depicting an experimentally determined relation between a temperature change measured in the boiler 6 of an actual embodiment of the coffee maker 1 and an associated time interval. In the graphical drawing, two curves are shown. A first curve, which is indicated in a continuous manner, is obtained for a boiler 6 filled with water, wherein the heating element 62 of the boiler 6 has been activated during 12 seconds at a maximum power. A second curve, which is indicated in an interrupted manner, is obtained for an empty boiler 6, wherein the heating element 62 of the boiler 6 has been activated during 12 seconds at a minimum power.

The variation of the applied power is related to a possible variation of the mains voltage, and a possible variation of the power of the heating element 62. The curves are determined for the situations which are closest to each other, i.e. the situation of the boiler 6 being filled with water and both the mains voltage and the power of the heating element 62 being at a maximum and the situation of the boiler 6 being empty and both the mains voltage and the power of the heating element 62 being at a minimum.

The following values and tolerances are applicable to the shown graphical drawing:

mains voltage=230 Volt±10% power of the heating element 62=1400 Watt+5%, −10%

On the basis of these values and tolerances, the maximum power is calculated as follows:

$$P_{max} = P_{nom} * 1.05 * \left(\frac{V_{nom} * 1.1}{V_{nom}}\right)^2$$

$$= 1.27 * P_{nom}$$

$$= 1.27 * 1400$$

$$= 1778 \text{ Watt}$$

wherein $P_{max}$ represents the maximum power, $P_{nom}$ represents the nominal power and $V_{nom}$ represents the nominal voltage.

Likewise, the minimum power is calculated as follows:

$$P_{min} = P_{nom} * 0.9 * \left(\frac{V_{nom} * 0.9}{V_{nom}}\right)^2$$

$$= 0.725 * P_{nom}$$

$$= 0.725 * 1400$$

$$= 1015 \text{ Watt}$$

wherein $P_{min}$ represents the minimum power.

In the graphical drawing, a relation between a temperature change measured in the boiler 6 and an associated time interval is depicted. In this case, the length of the time interval is 3 seconds. Hence, a first value of the temperature change is obtained by calculating a difference between the temperature at a starting point of the measurement and a point 3 seconds later than the starting point, a second value of the temperature change is obtained by calculating a difference between the temperature at the point 3 seconds later than the starting point and a point 6 seconds later than the starting point, etc. The values forming the basis of the curves are represented in the following table.

| Time interval (s) | Empty boiler, $P_{min}$ Temperature change (K) | Filled boiler, $P_{max}$ Temperature change (K) |
| --- | --- | --- |
| 0-3 | <1 | <1 |
| 3-6 | <1 | <1 |
| 6-9 | 2 | <1 |
| 9-12 | 2.5 | 4.5 (4.5-5) |
| 12-15 | 3.5 | 5.0 (4.3-5) |
| 15-18 | 3.5 | 1.8 (1-1.8) |
| 18-21 | 3.1 | 1.0 (1-1.2) |
| 21-24 | 2.4 | 0.7 (0.5-1.1) |

It is noted that the values of the temperature change associated with the filled boiler 6 are average values, as these values are influenced by the flow of the water.

On the basis of the determined values, it is concluded that in order to be able to make a clear distinction between a situation in which an empty boiler 6 is heated and a situation in which a filled boiler 6 is heated, the temperature changes of time intervals later than 18 seconds from the starting point need to be considered. At 18 seconds from the starting point, the temperature change associated with a filled boiler 6 has become significantly smaller than the temperature change associated with an empty boiler 6. The significant difference between the temperature change associated with a filled boiler 6 and the temperature change associated with an empty boiler 6 remains at least until the last time interval during which the temperature change is measured (21-24 seconds).

In order to be able to reliably determine whether the boiler 6 is filled or empty, the following procedure may be performed:
1) activate the heating element 62 during 12 seconds;
2) determine the temperature in the boiler 6 at 18 seconds from the starting point;
3) determine the temperature in the boiler 6 at 21 seconds from the starting point;
4) calculate the difference between the measured temperatures in order to determine the temperature change over the time interval 18-21 seconds; and
5) compare the calculated temperature change to a reference temperature change of, for example, 2.0 K. If the calculated temperature change is larger than 2.0 K, the boiler 6 is empty and needs to be filled with water before the heating element 62 is activated again. If the calculated temperature change is smaller than 2.0 K, the boiler 6 is already filled with water and the heating element 62 may be activated to put the temperature of the water to the predetermined temperature, without any intermediate actions being necessary.

It is noted that the above-mentioned values of the length of time during which the heating element 62 of the boiler 6 is activated, the starting time and the length of the time interval over which the temperature change is determined, and the reference temperature change are just meant as examples. Within the scope of the present invention, other suitable values may be chosen. Furthermore, the values of the applied voltage and power may also be different from the ones mentioned in the above. In most cases, if at least one of these values is changed, the characteristics of the procedure of determining the thermal behaviour of the boiler 6, and the reference value which is used in the procedure of categorizing the determined thermal behaviour, need to be changed as well.

It will be clear to a person skilled in the art that the scope of the present invention is not limited to the examples discussed in the foregoing, but that several amendments and modifications thereof are possible without deviating from the scope of the present invention as defined in the attached claims.

The above-described coffee maker 1 comprises a one cup button 22 and a two cups button 23. However, within the scope of the present invention, it is not essential whether the number of cups can be chosen or not, and it is not essential which quantity or quantities of coffee can be delivered by the coffee maker 1. For example, a coffee maker 1 being arranged such as to deliver only one predetermined amount of coffee and having only one button for starting the secondary procedure is also covered by the present invention. In fact, the present invention is applicable to coffee makers 1 and all kinds of other devices comprising a boiler 6 having a container 61 and a heating element 62, wherein the further design of the coffee maker 1 or the other device is of secondary importance.

In the foregoing, a method for operating a boiler 6 of a device such as a coffee maker 1 is disclosed, which comprises initial steps aimed at determining whether the boiler 6 is filled with water or not. In the process, the insight that the thermal behaviour of an empty boiler 6 differs from the thermal behaviour of a filled boiler 6 is applied.

A heating element 62 of the boiler 6 is used to generate heat during a predetermined length of time. As a result, the temperature inside the boiler 6 starts to change. At a certain point, the temperature change over a time interval having a predetermined length is measured. Subsequently, the measured temperature change is compared with a reference temperature change. In case the measured temperature change is larger than the reference temperature change, it is concluded that the boiler 6 is empty and needs to be filled. In case the measured temperature change is smaller than the reference temperature change, it is concluded that water is present in the boiler 6, and a process of further heating the water to a predetermined temperature can be started directly.

The invention claimed is:
1. A device comprising:
a boiler which comprises a container for containing water, a filler for filling the container with water, and a heating element for heating the water to a predetermined temperature, and a controller which is programmed such as to perform the successive acts of:

activating the heating element of the boiler during a predetermined length of time;

measuring at least one characteristic of the thermal behavior displayed by the boiler as a consequence of the activation of the heating element including recording a first temperature at a first time and recording a second temperature at a second time, wherein the first time is after a first time period after the predetermined length of time, and the second time is after a second time period after the predetermined length of time and the first time;

verifying whether the measured characteristic is in a range associated with thermal behavior of a boiler filled with water or a range associated with thermal behavior of an empty boiler;

only in case the measured characteristic appears to be in the range associated with thermal behavior of an empty boiler, filling the container of the boiler with a predetermined quantity of water using the filler; and activating the heating element of the boiler to heat the water in the container of the boiler to the predetermined temperature.

2. The device according to claim 1, further comprising a temperature detector for detecting a temperature inside the boiler, which temperature detector is located at a distance from the heating element.

3. The device of claim 1, wherein the predetermined length of time is greater than the first time period, and the first time period is greater than second time period.

4. The device of claim 1, wherein the device comprises a coffee maker.

5. A method for operating a boiler of a device, wherein the boiler comprises a container for containing water, a filler for filling the container with water, and a heating element for heating the water to a predetermined temperature, the method comprising the following successive acts:

activating the heating element of the boiler during a predetermined length of time;

measuring at least one characteristic of the thermal behavior displayed by the boiler as a consequence of the activating act of the heating element including recording a first temperature at a first time and recording a second temperature at a second time, wherein the first time is after a first time period after the predetermined length of time, and the second time is after a second time period after the predetermined length of time and the first time;

verifying whether the measured characteristic is in a range associated with thermal behavior of a boiler filled with water or a range associated with thermal behavior of an empty boiler;

only in case the measured characteristic appears to be in the range associated with thermal behavior of an empty boiler, filling the container of the boiler with a predetermined quantity of water using the filler; and activating the heating element of the boiler to heat the water in the container of the boiler to the predetermined temperature.

6. The method according to claim 5, wherein the verifying act comprises comparing the measured characteristic with a reference characteristic, which is between the range associated with thermal behavior of a boiler filled with water and the range associated with thermal behavior of an empty boiler, in order to determine whether the measured characteristic is at a side of the reference characteristic where the range associated with thermal behavior of a boiler filled with water is or a side of the reference characteristic where the range associated with thermal behavior of an empty boiler is.

7. The method according to claim 1, wherein the measuring act comprises measuring a temperature change in the boiler at a measuring position which is located at a distance from the heating element, over a time interval having a predetermined length and a predetermined starting time with respect to a starting time of the operation of the heating element; and wherein the verifying act comprises comparing a measured temperature change with a predetermined reference temperature change which is below a range of temperature changes associated with an empty boiler, and which is above a range of temperature changes associated with a boiler filled with water.

8. The method according to claim 1, wherein the device comprises a pump for pumping water to the boiler, and wherein the filling act comprises activating the pump during a predetermined length of time.

9. The method according to claim 1, wherein the measuring act is performed after the predetermined length of time during which the heating element of the boiler is activated has lapsed.

10. The method according to claim 9, wherein the measuring act is performed after a temperature change of a filled boiler, measured over a predetermined time interval, has become smaller than a temperature change of an empty boiler, measured over the same time interval.

11. The method according to claim 1, wherein the second activating act is initiated before the filling act has finished.

12. The method according to claim 1, wherein the predetermined quantity of water with which the container of the boiler is filled during the filling act is equal to or smaller than the volume of the container.

13. The method of claim 1, wherein the predetermined length of time is 12 seconds, the first time period is 6 seconds so that the first time is 18 seconds from the activating act, and the second time period is 3 seconds so that the second time is 21 seconds from the activating act.

14. The method of claim 1, wherein the predetermined length of time is greater than the first time period, and the first time period is greater than second time period.

15. The method of claim 1, wherein the device comprises a coffee maker.

* * * * *